United States Patent
Lee et al.

(10) Patent No.: US 8,606,040 B2
(45) Date of Patent: Dec. 10, 2013

(54) METHOD AND APPARATUS FOR IMAGE CONVERSION

(75) Inventors: An-Shih Lee, Zhubei (TW); Jou-Ping Chen, Hsinchu County (TW)

(73) Assignee: Realtek Semiconductor Corp., Hsinchu (TW)

(*) Notice: Subject to any disclaimer, the term of this patent is extended or adjusted under 35 U.S.C. 154(b) by 229 days.

(21) Appl. No.: 13/304,536

(22) Filed: Nov. 25, 2011

(65) Prior Publication Data

US 2012/0134602 A1  May 31, 2012

(30) Foreign Application Priority Data

Nov. 25, 2010 (TW) ................................ 99140699 A (51) Int. Cl.
*G06K 9/36* (2006.01)
(52) U.S. Cl.
USPC ........... 382/276; 382/235; 382/243; 382/299; 358/1.2; 358/452; 358/453
(58) Field of Classification Search
USPC ........... 382/235, 243, 278, 299; 358/1.2, 452, 358/453
See application file for complete search history.

(56) References Cited

U.S. PATENT DOCUMENTS

| | | | |
|---|---|---|---|
| 7,295,765 B1* | 11/2007 | Kijima | 386/232 |
| 7,428,998 B2* | 9/2008 | Zhu et al. | 235/472.01 |
| 7,587,073 B2* | 9/2009 | Park | 382/128 |
| 7,712,119 B1* | 5/2010 | Nakaya | 725/62 |
| 8,111,235 B2* | 2/2012 | Baba et al. | 345/102 |

\* cited by examiner

*Primary Examiner* — Yosef Kassa
(74) *Attorney, Agent, or Firm* — Birch, Stewart, Kolasch & Birch, LLP (57) ABSTRACT

An image conversion device is disclosed, having an image converting circuit for receiving a first and a second image frames of a first format and generating a third and a fourth image frames of a second format; and a signal generating circuit coupled with the image converting circuit for generating a plurality of first synchronization signals having a substantially fixed period and one or more second synchronization signals for the third and the fourth image frames, wherein each of the second synchronization signals is synchronized with one of the first synchronization signals and the third image frame contains at least one more first synchronization signal than the fourth image frame.

20 Claims, 8 Drawing Sheets

METHOD AND APPARATUS FOR IMAGE CONVERSION

CROSS-REFERENCE TO RELATED APPLICATIONS

This application claims the benefit of priority to Taiwanese Patent Application No. 099140699, filed on Nov. 25, 2010, the entirety of which is incorporated herein by reference for all purposes.

BACKGROUND

The present disclosure generally relates to image conversion devices, and more particularly, to image conversion devices for generating synchronized horizontal synchronization signals and vertical synchronization signals.

As the technology evolves, various types of display devices are available on the market. Different display devices may have different specifications for image display. Sometimes, users may also want to watch the image in a format different from the format of the source image data. The source image data, therefore, may need to be converted to the appropriate format in order to be correctly displayed on the display device. Image conversion devices are used to convert the source image data to the appropriate format to be compatible with the specification of the display device, so that the converted image data may be displayed on the display device correctly. The image mentioned hereinafter may comprise pictures, videos, animations, and/or other visually acceptable material.

For example, when the source image frames of the resolution $H1 \times V1$ are displayed at a frequency of F Hz (i.e., in 1/F seconds), it means every source image frame has V1 scanlines and every scanline has H1 pixels. The image frames along with the corresponding vertical synchronization signals and horizontal synchronization signals are provided to the display device. The display device may update the image frames according to the vertical synchronization signals and update the scanlines according to the horizontal synchronization signals. Therefore, when generating the vertical synchronization signals and the horizontal synchronization signals, the horizontal blanking interval between the horizontal synchronization signals and the vertical blanking interval between the vertical synchronization signals should be configured to be compatible with the specification of the display device. For example, when the period of the pixel clock is Tclkp1 seconds, the period of the horizontal synchronization signals is $(H1+a1) \times Tclkp1$ second. The $H1 \times Tclkp1$ seconds are used to transmit the data of the H1 pixels of a scanline in the source image frame and the $a1 \times Tclkp1$ seconds are used as the horizontal blanking interval. The period of the vertical synchronization signals equals $(V1+b1)$ times the period of the horizontal synchronization signals, i.e., $(V1+b1) \times (H1+a1) \times Tclkp1$ seconds. The $V1 \times (H1+a1) \times Tclkp1$ seconds are used to transmit the data of the V1 scanlines and the horizontal blanking intervals. The $b1 \times (H1+a1) \times Tclkp1$ seconds are used as the vertical blanking interval.

When the source image frames of the resolution $H1 \times V1$ are to be displayed on a display device of the resolution $H2 \times V2$, the image conversion device needs to convert the source image frames of the resolution $H1 \times V1$ into the image frames of the resolution $H2 \times V2$. Furthermore, the image conversion device needs to provide the horizontal synchronization signals and vertical synchronization signals compatible with the specification of the display device. For example, when the period of the pixel clock supported by the display device is Tclkp2 seconds, the period of the horizontal synchronization signals of the converted image frame is $(H2+a2) \times Tclkp2$. The $H2 \times Tclkp2$ seconds are used to transmit the data of the H2 pixels of a scanline to the display device and the $a2 \times Tclkp2$ seconds are used as the horizontal blanking interval. The period of the vertical synchronization signals of the converted image frames equals $(V2+b2)$ times the period of the horizontal synchronization signals, i.e., $(V2+b2) \times (H2+a2) \times Tclkp2$ seconds. The $V2 \times (H2+a2) \times Tclkp2$ seconds are used to transmit the data of the V2 scanlines to the display device and the horizontal blanking intervals. The $b2 \times (H2+a2) \times Tclkp2$ seconds are used as the vertical blanking interval. Moreover, $(V2+b2) \times (H2+a2) \times Tclkp2$ seconds should equal to 1/F seconds so that the converted images frames may be synchronized with the source image frames.

In some applications, the source image frames are to be displayed on the display device of the resolution $H1 \times V1$, but the horizontal blanking interval and/or the vertical blanking interval need to be converted. For example, when the period of the pixel clock of the display device is Tclkp3 seconds, the image conversion device needs to provide the horizontal synchronization signals with the period of $(H1+a3) \times Tclkp3$ seconds. The $H1 \times Tclkp1$ seconds are used to transmit the data of the H1 pixels of a scanline to the display device and the $a3 \times Tclkp3$ seconds are used as the horizontal blanking interval. The period of the vertical synchronization signals equals $(V1+b3)$ times the period of the horizontal synchronization signals, i.e., $(V1+b3) \times (H1+a3) \times Tclkp3$ seconds. The $V1 \times (H1+a3) \times Tclkp3$ seconds are used to transmit the data of the V1 scanlines to the display device and the horizontal blanking intervals. The $b3 \times (H1+a3) \times Tclkp3$ seconds are used as the vertical blanking interval. Moreover, $(V1+b3) \times (H1+a3) \times Tclkp3$ seconds should equal to 1/F seconds so that the converted images frames may be synchronized with the source image frames.

When the horizontal synchronization signals and the vertical synchronization signals of the converted image frame are not synchronized, the data of the pixels of the last scanline in an image frame may not be completely displayed and abnormal images may be shown on the display device, e.g., freeze frames and lost frames. For example, when the start time of the vertical synchronization signals is different from the start time of the horizontal synchronization signals, or when the period of the vertical synchronization signals is not an integer multiple of the period of the horizontal synchronization signals, the horizontal synchronization signals and the vertical synchronization signals are not synchronized. Some image conversion devices try to solve the synchronization problem by adjusting the period of the pixel clock and the horizontal synchronization signals according to the format of the image frames to be displayed, e.g., the resolution, the horizontal blanking interval, the vertical blanking interval, and the display frequency. In the above example, the period of the pixel clock may be configured as $1/[(H2+a2) \times (V2+b2) \times F]$ seconds and the period of the horizontal synchronization signals may be configured as $1/[(V2+b2) \times F]$ seconds so that the converted image frames may be displayed on the display device at F Hz. Complicated circuits and algorithms, however, are required to generate the appropriate period of the pixel clock and the horizontal synchronization signals for different resolutions. Besides, some display devices may not support the converted period of the pixel clock and the horizontal synchronization signals, and therefore may not output correct image frames. A simplified conversion device for resolving the compatibility problems is therefore needed.

SUMMARY

In view of the foregoing, it can be appreciated that a substantial need exists for methods and apparatuses that can mitigate or reduce the problems in image conversion.

An embodiment of an image conversion device is disclosed comprising: an image converting circuit for receiving a first and a second image frames of a first format and generating a third and a fourth image frames of a second format; and a signal generating circuit, coupled with the image converting circuit, for generating a plurality of first synchronization signals having a substantially fixed period and one or more second synchronization signals for the third and the fourth image frames; wherein each of the second synchronization signals is synchronized with one of the first synchronization signals, and the third image frame contains at least one more first synchronization signal than the fourth image frame.

An embodiment of an image conversion method is disclosed comprising: receiving a first and a second image frames of a first format; generating a third image frame of a second format; generating a fourth image frame of the second format; generating a plurality of first synchronization signals for the third image frame and the fourth image frame; and generating one or more second synchronization signals for the third and the fourth image frames, each of the second synchronization signals synchronized with one of the first synchronization signals; wherein the first synchronization signals have a substantially fixed period, and the third image frame contains at least one more first synchronization signal than the fourth image frame.

Another embodiment of an image conversion device is disclosed, comprising: an image converting circuit for receiving a first and a second image frames and generating a third and a fourth image frames; and a signal generating circuit, coupled with the image converting circuit, for generating a plurality of first synchronization signals having a substantially fixed period and one or more second synchronization signals for the third image frame and the fourth image frame; wherein the signal generating circuit synchronizes the first synchronization signals and the second synchronization signals by delaying the start time of the second synchronization signal to the start time of one of the first synchronization signals.

It is to be understood that both the foregoing general description and the following detailed description are exemplary and explanatory only and are not restrictive of the invention, as claimed.

DETAILED DESCRIPTION

Reference will now be made in detail to embodiments of the invention, which are illustrated in the accompanying drawings. The same reference numbers may be used throughout the drawings to refer to the same or like parts or components/operations. Certain terms are used throughout the description and following claims to refer to particular components. As one skilled in the art will appreciate, vendors may refer to a component by different names. This disclosure does not intend to distinguish between components that differ in name but not in function. In the following description and in the claims, the term "comprise" are used in an open-ended fashion, and thus should be interpreted to mean "include, but not limited to . . . " The phrase "coupled with" is intended to compass any indirect or direct connection. Accordingly, when this document mentioned that a first device is coupled with a second device, it means that the first device may be directly or indirectly connected to the second device through electrical connections, wireless communications, optical communications, or other signal connections with/without other intermediate devices or connection means.

Figure 1:
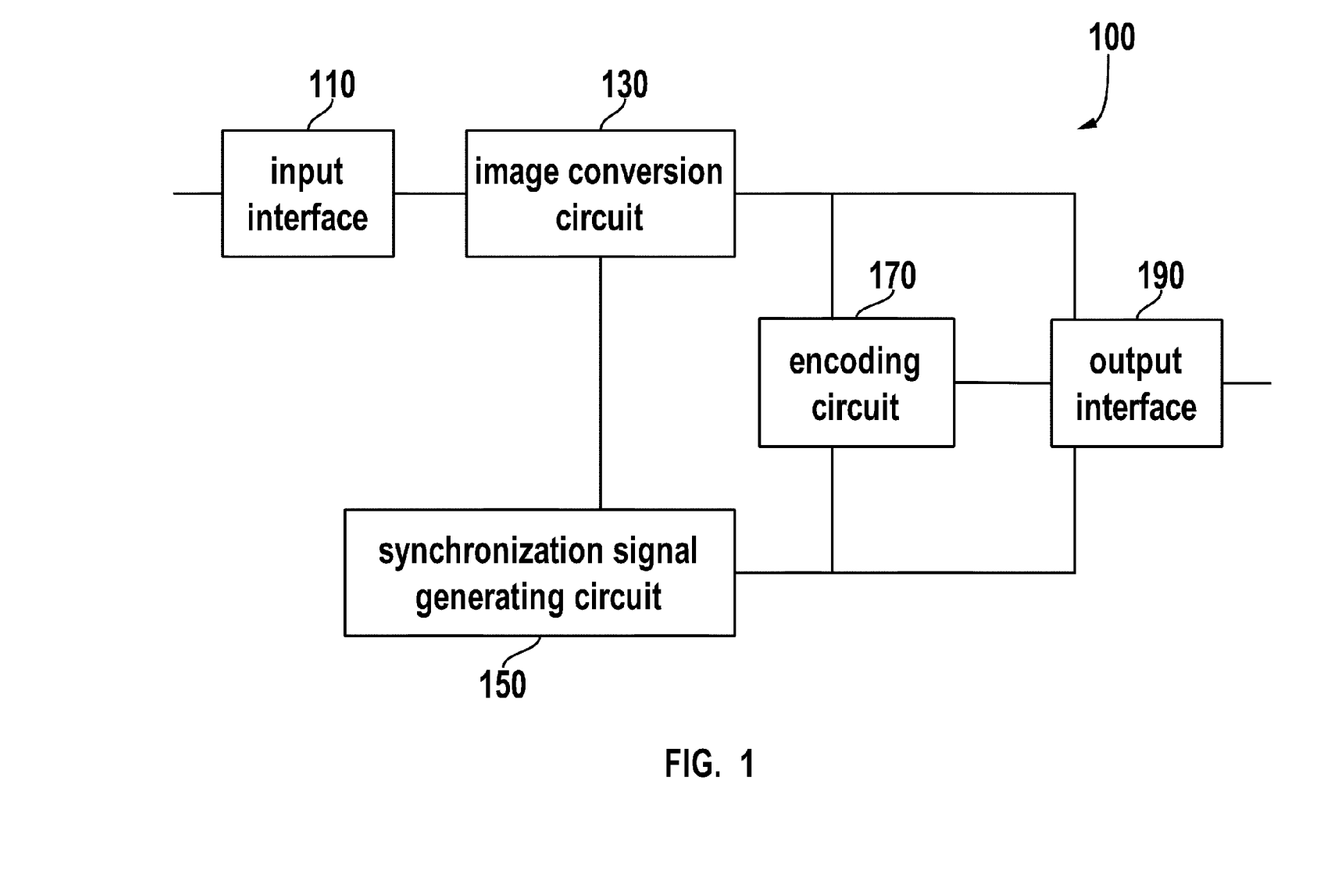
FIG. 1 shows a simplified block diagram of an example image conversion device.

FIG. 1 shows a simplified block diagram of an example image conversion device 100, arranged in accordance with at least some embodiments of the present disclosure. The image conversion device 100 comprises an input interface 110, an image conversion circuit 130, a synchronization signal generating circuit 150, an encoding circuit 170, and an output interface 190.

The interface 110 may be realized with any suitable standard or custom-defined bus/protocol, e.g., PCI, AGP, PCIe, LVDS, DVI, or HDMI. The interface 110 is used to couple with the image providing device, e.g., computers or media players, for receiving image data, horizontal synchronization signals, and/or vertical synchronization signals. The interface 110, then, transmits the received signals to the image conversion circuit 130 for further processing.

The image conversion circuit 130 is coupled with the interface 110 for converting the received image data into the required format, e.g., converting into the required resolution, the required horizontal blanking interval, and/or the required vertical blanking interval.

The synchronization signal generating circuit 150 is coupled with the image conversion circuit 130 and/or the input interface 110 for generating one or more synchronization signals for the converted image data. For example, the synchronization signal generating circuit 150 may generate the horizontal synchronization signals, according to which the display device may display/update the image data of a scanline in the appropriate time. The synchronization signal generating circuit 150 may also generate the vertical synchronization signals, according to which the display device may display/update the image data of an image frame in the appropriate time.

The synchronization signal generating circuit 150 may generate the horizontal synchronization signals and/or the vertical synchronization signals for the converted image data according to the horizontal synchronization signals and/or the vertical synchronization signals of the original image data. The synchronization signal generating circuit 150 may also collaborate with the image conversion circuit 130 for generating the horizontal synchronization signals and/or the vertical synchronization signals for the converted image data.

The encoding circuit 170 is coupled with the image conversion circuit 130 and the synchronization signal generating circuit 150 for encoding the converted image data and/or the synchronization signals into the required format and transmitting the encoded data to the output interface 190.

The output interface 190 is coupled with the image conversion circuit 130, the synchronization signal generating circuit 150, and/or the encoding circuit 170 for providing encoded or unencoded image data, synchronization signals, and/or other signals. The output interface may be realized with any suitable standard or custom-defined bus/protocol for transmitting the converted image data and the synchronization signals to the display device. Thus, the display device may correctly display the image in the required format.

The aforementioned image conversion circuit 130, the synchronization signal generating circuit 150, and the encoding circuit 170 may be realized with controllers, processors, computers, discrete circuits, integrated circuits, and/or the collaboration of hardware and software. The input interface 110, the image conversion circuit 130, the synchronization signal generating circuit 150, the encoding circuit 170, the output interface 190, and/or other component(s) in the image conversion device 100, collectively or respectively, may be coupled by any suitable standard or custom-defined bus/protocol, may be integrated as a single circuit component, and/or may be realized with a plurality of circuit components. For example, in one embodiment, the synchronization signal generating circuit 150 may be realized with a horizontal synchronization signal generating circuit and a vertical synchronization signal generating circuit. In another embodiment, the synchronization signal generating circuit 150 may be integrated with the image conversion circuit 130.

Figure 2:
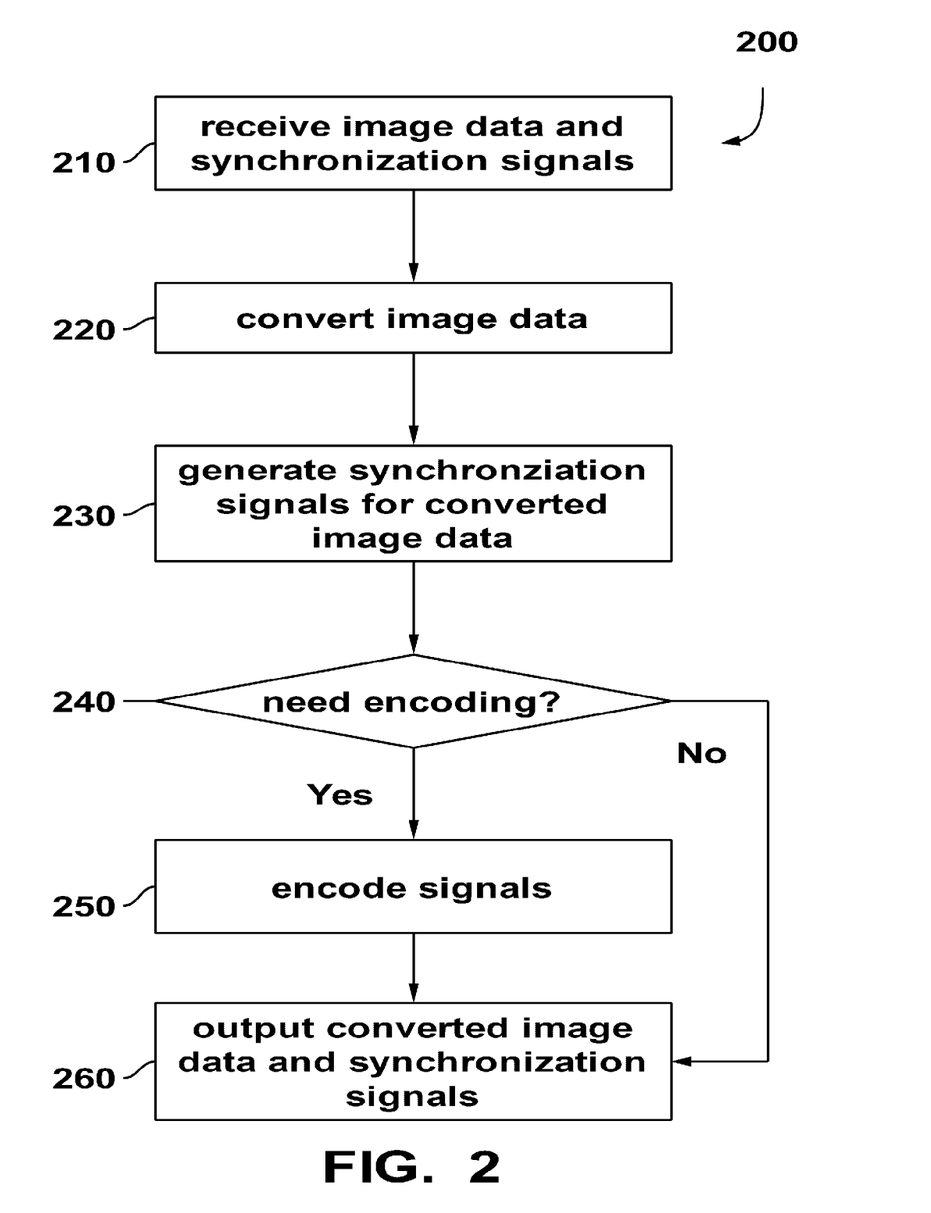
FIG. 2 show a simplified flow chart of an example image conversion method.

FIG. 2 shows a simplified flow chart 200 of an example image conversion method. The image conversion device 100 is further explained below accompanied with FIG. 2. For example, the display device supports a resolution H2×V2 and a period of the pixel clock Tclkp second. When the source image frames of the resolution H1×V1 are displayed at a frequency of F Hz, the converted image frames of the resolution H2×V2 should also be displayed at the frequency of F Hz to ensure the synchronization between the converted image frames and the source image frames. The period of the horizontal synchronization signals of the converted image frames is configured as (H2+a2)×Tclkp. The H2×Tclkp seconds are used to transmit the data of the H2 pixels of a scanline to the display device and the a2×Tclkp seconds are used as the horizontal blanking interval. The period of the vertical synchronization signals of the converted image frames is configured as (V2+b2)×(H2+a2)×Tclkp seconds. The V2×(H2+a2)×Tclkp seconds are used to transmit the data of the V2 scanlines to the display device and the horizontal blanking intervals. The b2×(H2+a2)×Tclkp seconds are used as the vertical blanking interval.

In the operation 210, the input interface 110 receives the image data, the horizontal synchronization signals, and/or the vertical synchronization signals from the image providing device and transmits the received signals to the image conversion circuit 130.

In the operation 220, the image conversion circuit 130 converts the source image frames of the resolution H1×V1 into the image frames of the resolution H2×V2 by interpolation, extrapolation, and/or other algorithms.

In the operation 230, the synchronization signal generating circuit 150 generates the horizontal synchronization signals with a fixed period of (H2+a2)×Tclkp seconds according to the period of the pixel clock Tclkp seconds. In some embodiments, the display device may support multiple the pixel clocks. The synchronization signal generating circuit 150 may choose the appropriate pixel clock according to the default setting of the display device, the instruction of the user, or other algorithms. In this embodiment, the synchronization signal generating circuit 150 also generates the vertical synchronization signals and configures the start time of the vertical synchronization signals to be substantially the same as the start time of one of the horizontal synchronization signals. The neighboring vertical synchronization signals are separated by the duration of an integral multiple of the period of the horizontal synchronization signals. Thus, the converted image frames may be correctly displayed in the duration of an integral multiple of the period of the horizontal synchronization signals. The start time of the horizontal synchronization signals and the vertical synchronization signals being substantially the same may mean that the start time of the active state of the horizontal synchronization signals and the vertical synchronization signals are substantially the same.

For example, in one embodiment, the synchronization signal generating circuit 150 generates a first vertical synchronization signal for a first image frame, which has substantially the same start time with a first horizontal synchronization signal, e.g., the $1^{st}$ horizontal synchronization signal. The synchronization signal generating circuit 150 also generates the horizontal synchronization signals with the period of (H2+a2)×Tclkp seconds. When the synchronization signal generating circuit 150 generates a second vertical synchronization signal for a second image frame and the start time of the second vertical synchronization signal is not substantially the same as the start time of a horizontal synchronization signal, the synchronization signal generating circuit 150 delays the start time of the second vertical synchronization signal to be substantially the same as the start time of a horizontal synchronization signal. Thus, the first image frame may be displayed in the duration of an integer multiple of the period of the horizontal synchronization signals. For example, in one embodiment, the synchronization signal generating circuit 150 may delay the start time of second vertical synchronization signal to the start time of the closest horizontal synchronization signal, e.g., the $(N+1)^{th}$ horizontal synchronization signal. Therefore, the first image frame may be displayed in the duration of N times the period of the horizontal synchronization signals, i.e., N×(H2+a2)×Tclkp seconds. In another embodiment, the synchronization signal generating circuit 150 may delay the start time of second vertical synchronization signal to the start time of other horizontal synchronization signals, e.g. the $(N+2)^{th}$ horizontal synchronization signal. Therefore, the first image frame may be displayed in the duration of (N+1) times the period of the horizontal synchronization signals, i.e., (N+1)×(H2+a2)×Tclkp seconds. According to the methodology described above, the synchronization signal generating circuit 150 may generate the vertical synchronization signals and the horizontal synchronization signals for every converted image frames and transmit the synchronization signals to the encoding circuit 170 and/or output interface 190.

In one embodiment, when the converted image frame is displayed in the duration of N times the period of the horizontal synchronization signals, the N×(H2+a2)×Tclkp seconds may not be the same as 1/F seconds of the source image frame. When the time difference of the N×(H2+a2)×Tclkp seconds and 1/F seconds of multiple image frames are accumulated to be equal to or large than (H2+a2)×Tclkp seconds and the synchronization signal generating circuit 150 delays the start time of a vertical synchronization signal to the start time of the closest horizontal synchronization signal, one converted image frame will only have the duration of (N−1) times the period of the horizontal synchronization signals to be displayed, i.e., (N−1)×(H2+a2)×Tclkp seconds. The time difference, therefore, does not accumulate and the converted image frames may be correctly displayed. For example, in the embodiment above, when the third vertical synchronization signal for a third image frame is synchronized with the $(2N+1)^{th}$ horizontal synchronization signal and the time difference has already accumulated to be equal to or large than (H2+ a2)×Tclkp seconds, the synchronization signal generating circuit 150 delays the start time of fourth vertical synchronization signal to the start time of the closest horizontal synchronization signal, e.g., the $(3N)^{th}$ horizontal synchronization signal. Therefore, the third image frame may be displayed in the duration of (N−1) times the period of the horizontal synchronization signals. In other embodiments, the synchronization signal generating circuit 150 may delay the start time of one or more vertical synchronization signals after the time difference has accumulated to multiple of (H2+a2)×Tclkp seconds. For example, after the time difference has accumulated to 5×(H2+a2)×Tclkp, the synchronization signal generating circuit 150 delays one or more vertical synchronization signals so that a converted image frame has the duration of (N−5) times the period of the horizontal synchronization signals to be displayed, or each of five converted image frames has the duration of (N−1) times the period of the horizontal synchronization signals to be displayed.

In the operation 240, the signal encoding operation is determined to be needed or not according to the specification of the output interface 190, the specification of the display device, or other system settings. When the signals encoding operation is need, continue to the operation 250. If not, continue to the operation 260.

In the operation 250, the encoding circuit 170 encodes the converted image data, the horizontal synchronization signals, the vertical synchronization signals, and/or other signals into the suitable format, e.g., the format suitable to be transmitted in DVI, LVDS, HDMI, or other interface.

In other embodiments, the synchronization of the horizontal synchronization signals and the vertical synchronization signals may be combined with the encoding operation. For example, the synchronization signal generating circuit 150 transmits the unsynchronized horizontal synchronization signals and vertical synchronization signals to the encoding circuit 170, and the encoding circuit 170 encodes and outputs the synchronized horizontal synchronization signals and vertical synchronization signals.

In the operation 260, the image conversion device 100 outputs encoded/unencoded horizontal synchronization signals, vertical synchronization signals, and/or converted image data through the output interface 190 to the display device. The display device, therefore, may correctly display the converted image data.

Figure 3:
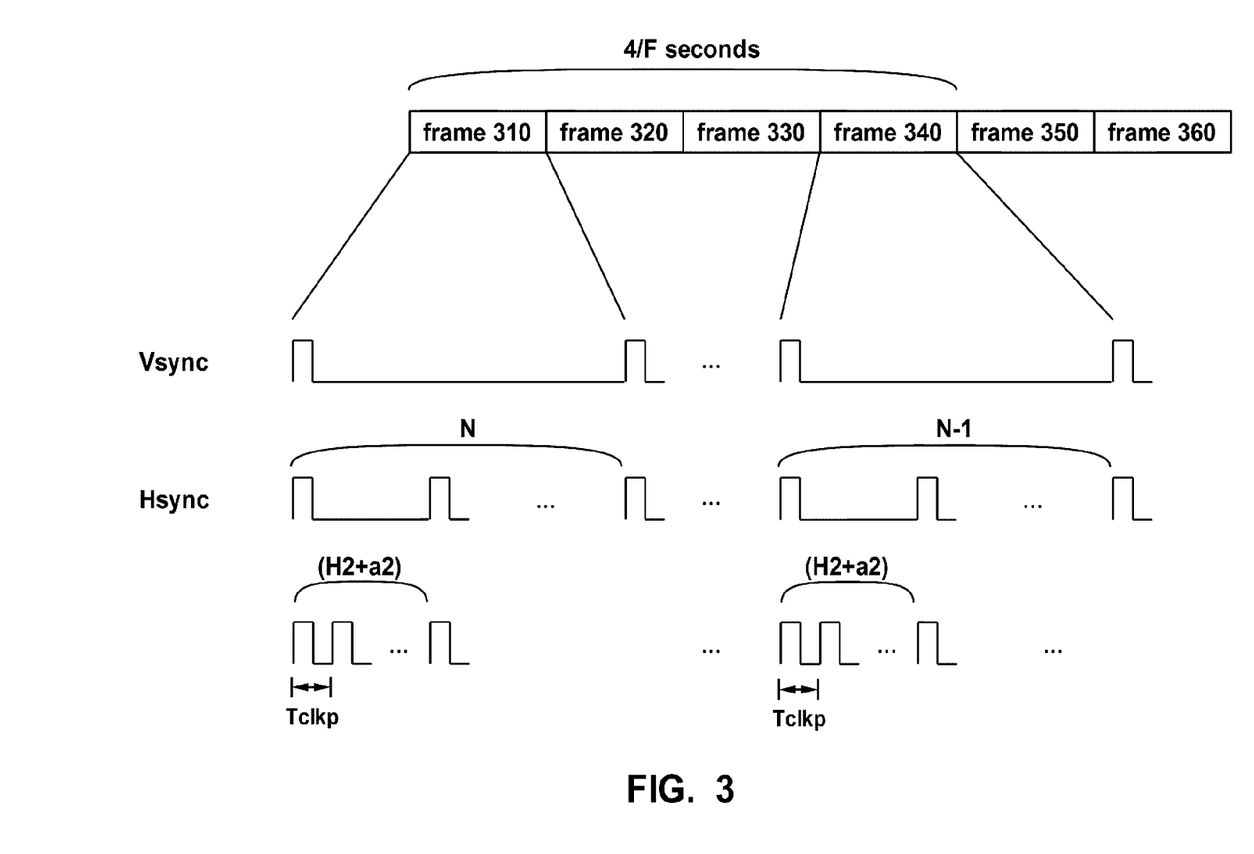
FIG. 3 shows an example of image frames, horizontal synchronization signals and vertical synchronization signals.

FIG. 3 shows an example embodiment of the converted image data, the horizontal synchronization signals, and the vertical synchronization signals provided by the image conversion device 100 in the operation 230. The image frame 310 corresponds to one of the vertical synchronization signals Vsync, and the neighboring horizontal synchronization signals Hsync are separated by (H2+a2) times the period of the pixel clock Tclkp seconds, i.e., the period of the horizontal synchronization signals is (H2+a2)×Tclkp seconds. Each of the vertical synchronization signals Vsync has substantially the same start time as one of the horizontal synchronization signals. The image frames 310, 320, and 330, respectively, correspond to one vertical synchronization signals and N horizontal synchronization signals. Assuming that at the end of the image frame 340, the time difference has accumulated to (H2+a2)×Tclkp seconds. When the synchronization signal generating circuit 150 synchronizes the vertical synchronization signal of the image frame 350 to the closest horizontal synchronization signal, the image frame 340 has (N−1) times the period of the horizontal synchronization signals and the time difference is eliminated. The average display time for image frames 310~340 and therefore for all the converted image frames is, therefore, approximately 1/F seconds. The time difference does not accumulate boundlessly and the converted image frames may be correctly displayed on the display device.

Figure 4:
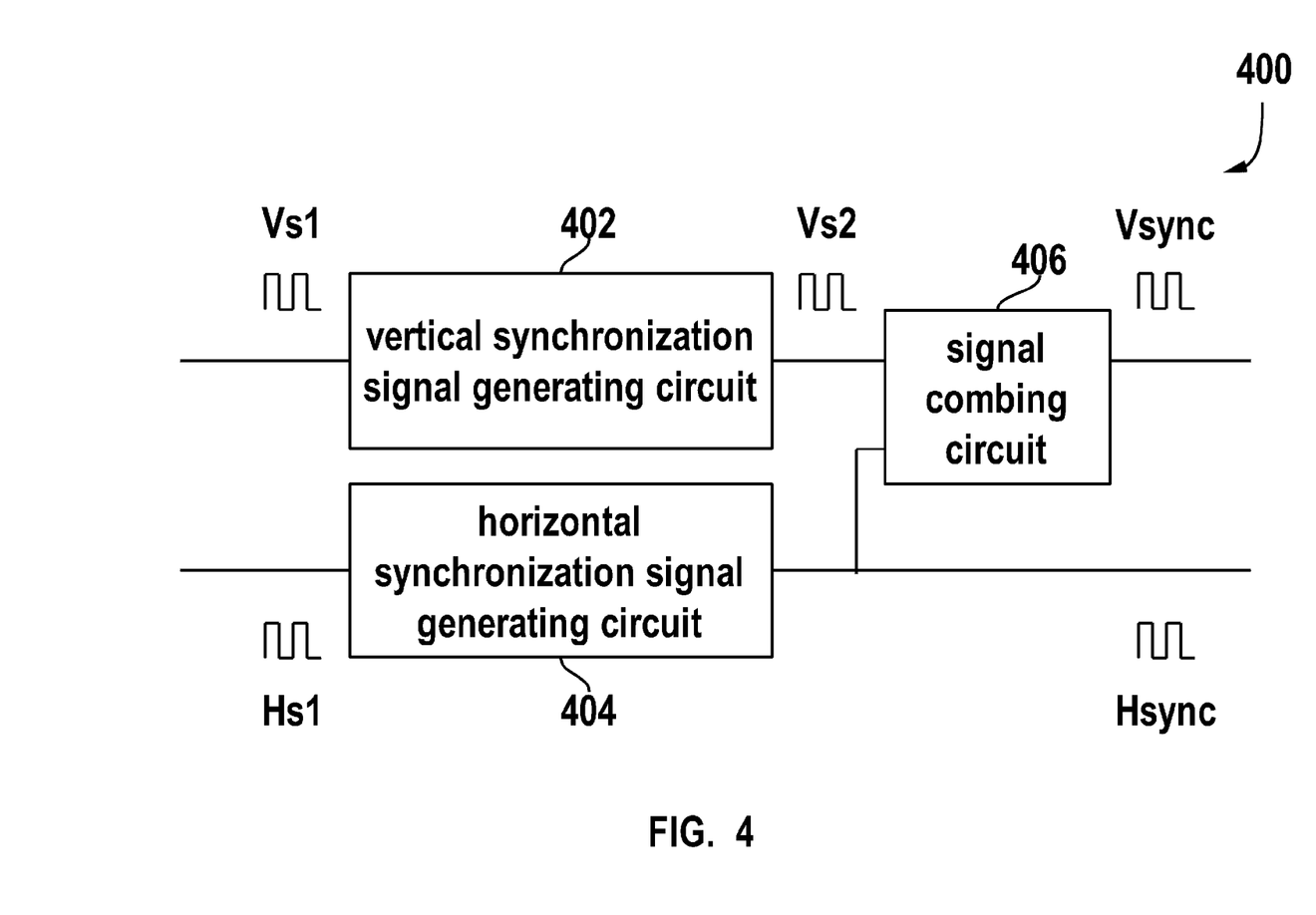
FIGS. 4-6 show the simplified block diagrams of several example synchronization signal generating circuits.

FIG. 4 shows a simplified block diagram 400 of the synchronization signal generating circuit 150 in FIG. 1. In this embodiment, the synchronization signal generating circuit 400 comprises a vertical synchronization signal generating circuit 402 for generating vertical synchronization signals Vs2 according to the vertical synchronization signals Vs1 received in the operation 230. The synchronization signal generating circuit 400 further comprises a horizontal synchronization signal generating circuit 404 for generating horizontal synchronization signals Hsync according to the horizontal synchronization signals Hs1 received in the operation 230.

The synchronization signal generating circuit 400 further comprises a signal combing circuit 406. The signal combing circuit 406 may be realized with "AND" gates, combination logic circuits, storage devices with control signals, or other suitable circuit components. The signal combing circuit 406 may combine the vertical synchronization signals Vs2 with the horizontal synchronization signals Hsync to generate the synchronized vertical synchronization signals Vsync. Thus, the start time of the vertical synchronization signals Vsync may be substantially the same as the start time of one of the horizontal synchronization signals Hsync. In other embodiments, signal buffer or other memory device may be configured in the path(s) of the horizontal synchronization signals Hsync and/or the vertical synchronization signals Vsync to make the start time of the vertical synchronization signals and the horizontal synchronization signals better aligned.

In other embodiments, there is a time difference between the process time for generating the vertical synchronization signals Vsync and the horizontal synchronization signals Hsync. The signal combing circuit 406 may combine the signal Vs2 with one of the horizontal synchronization signals Hsync to generate the vertical synchronization signals Vsync so that the vertical synchronization signals Vsync may be synchronized with another one of horizontal synchronization signals Hsync. For example, the signal combing circuit 406 combines the signal Vs2 and the $(N-3)^{th}$ horizontal synchronization signal to generate one of the vertical synchronization signals Vsync so that the generated vertical synchronization signal may be synchronized with the $N^{th}$ horizontal synchronization signal or other horizontal synchronization signal.

In another embodiment, the vertical synchronization signals Vs1 and/or the horizontal synchronization signals Hs1 may also be substituted with the received image data for generating the signals Vs2, Hsync, and/or Vsync.

Figure 5:
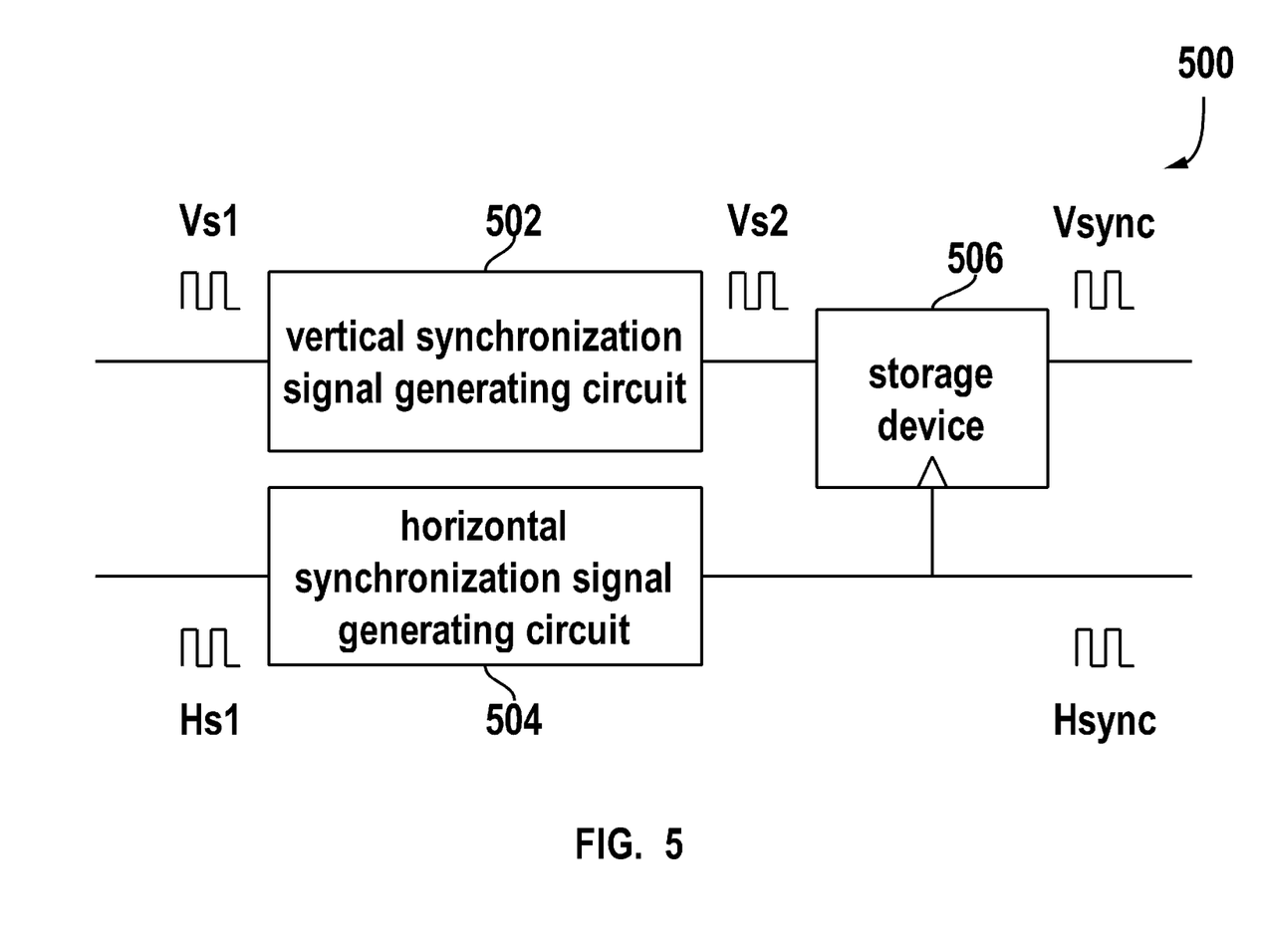

FIG. 5 shows another simplified block diagram 500 of the synchronization signal generating circuit 150 in FIG. 1. In this embodiment, the synchronization signal generating circuit 500 comprises a vertical synchronization signal generating circuit 502 for generating vertical synchronization signals Vs2 according to the vertical synchronization signals Vs1 received in the operation 230. The vertical synchronization signals Vs2 are stored in the storage device 506, e.g., signal buffers, registers, or other suitable memory devices. The storage device 506 may output the stored vertical synchronization signals Vs2 upon or after receiving the enable signal. The synchronization signal generating circuit 500 further comprises a horizontal synchronization signal generating circuit 504 for generating horizontal synchronization signals Hsync according to the horizontal synchronization signals Hs1 received in the operation 230. In this embodiment, the horizontal synchronization signals Hsync are also used as the enable signal to trigger the storage device 506 to output the stored vertical synchronization signal Vsync. The vertical synchronization signal Vsync provided by the storage device 506, therefore, may be synchronized with one of the horizontal synchronization signals Hsync. In other embodiments, signal buffers or other memory devices may be configured in the path(s) of the horizontal synchronization signals Hsync and/or the vertical synchronization signals Vsync to make the start time of the vertical synchronization signals and the horizontal synchronization signals better aligned.

In another embodiment, the vertical synchronization signals Vs1 and/or the horizontal synchronization signals Hs1 may also be substituted with the received image data for generating the signals Vs2, Hsync, and/or Vsync.

Figure 6:
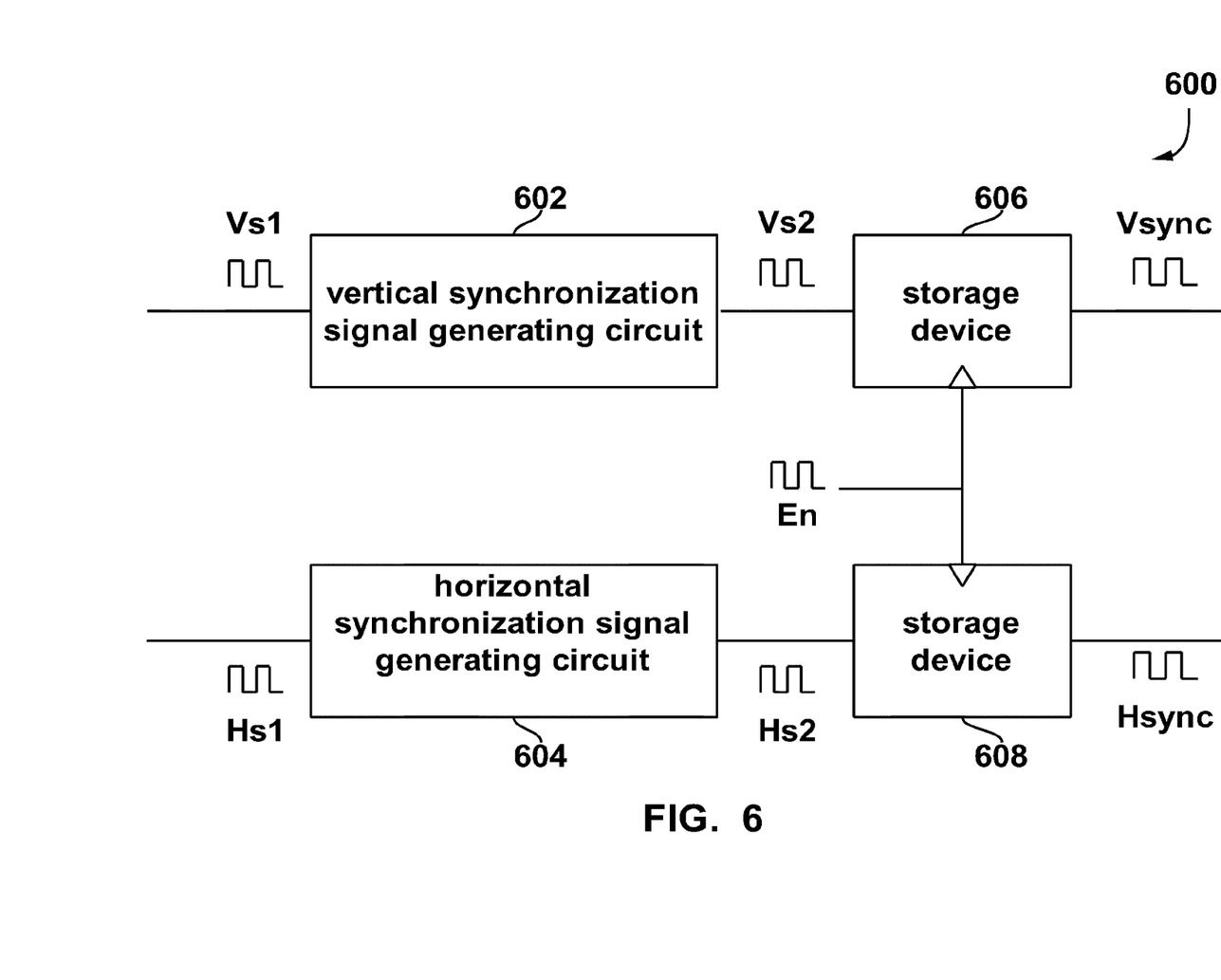

FIG. 6 shows another simplified block diagram 600 of the synchronization signal generating circuit 150 in FIG. 1. In this embodiment, the synchronization signal generating circuit 600 comprises a vertical synchronization signal generating circuit 602 for generating vertical synchronization signals Vs2 according to the vertical synchronization signals Vs1 received in the operation 230. The vertical synchronization signals Vs2 are stored in the storage device 606, e.g., signal buffers, registers, or other suitable memory devices. The synchronization signal generating circuit 600 further comprises a horizontal synchronization signal generating circuit 604 for generating horizontal synchronization signals Hsync according to the horizontal synchronization signals Hs1 received in the operation 230. The horizontal synchronization signals Hs2 are also stored in the storage device 608. An enable signal En, e.g., a clock signal or other suitable signals, may be used to trigger the storage devices 606 and 608 to output the synchronized vertical synchronization signals and horizontal synchronization signals.

In another embodiment, the vertical synchronization signals Vs1 and/or the horizontal synchronization signals Hs1 may also be substituted with the received image data for generating the signals Vs2, Hs2, Hsync, and/or Vsync.

Figure 7:
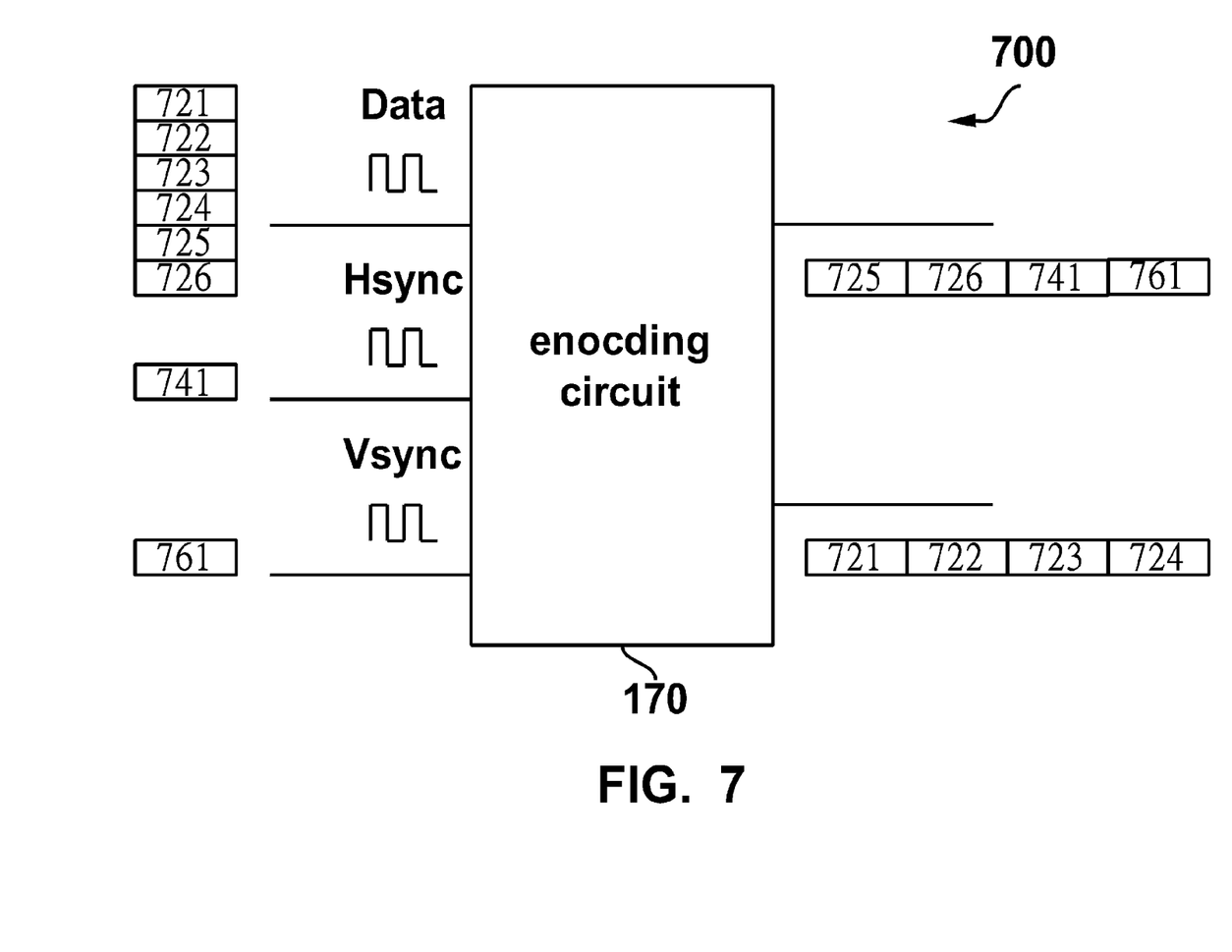
FIG. 7 shows an example encoding process of an example encoding circuit.

FIG. 7 shows a simplified block diagram 700 of the encoding circuit 170 in FIG. 1. In this embodiment, the encoding circuit 700 receives the image data Data, comprising six bits 721~726, the horizontal synchronization signal Hsync, comprising one bit 741, and the vertical synchronization signal Vsync, comprising one bit 761. Assuming the output interface 190 transmits data through two transmission lines, the image data, the horizontal synchronization signals, and the vertical synchronization signals are therefore encoded by the encoding circuit 700 for transmitting to the display device through the two transmission lines, as shown in FIG. 7. In other embodiments, the image data and synchronization signals may be encoded to other suitable format for transmitting on other interface/bus/protocol.

Figure 8:
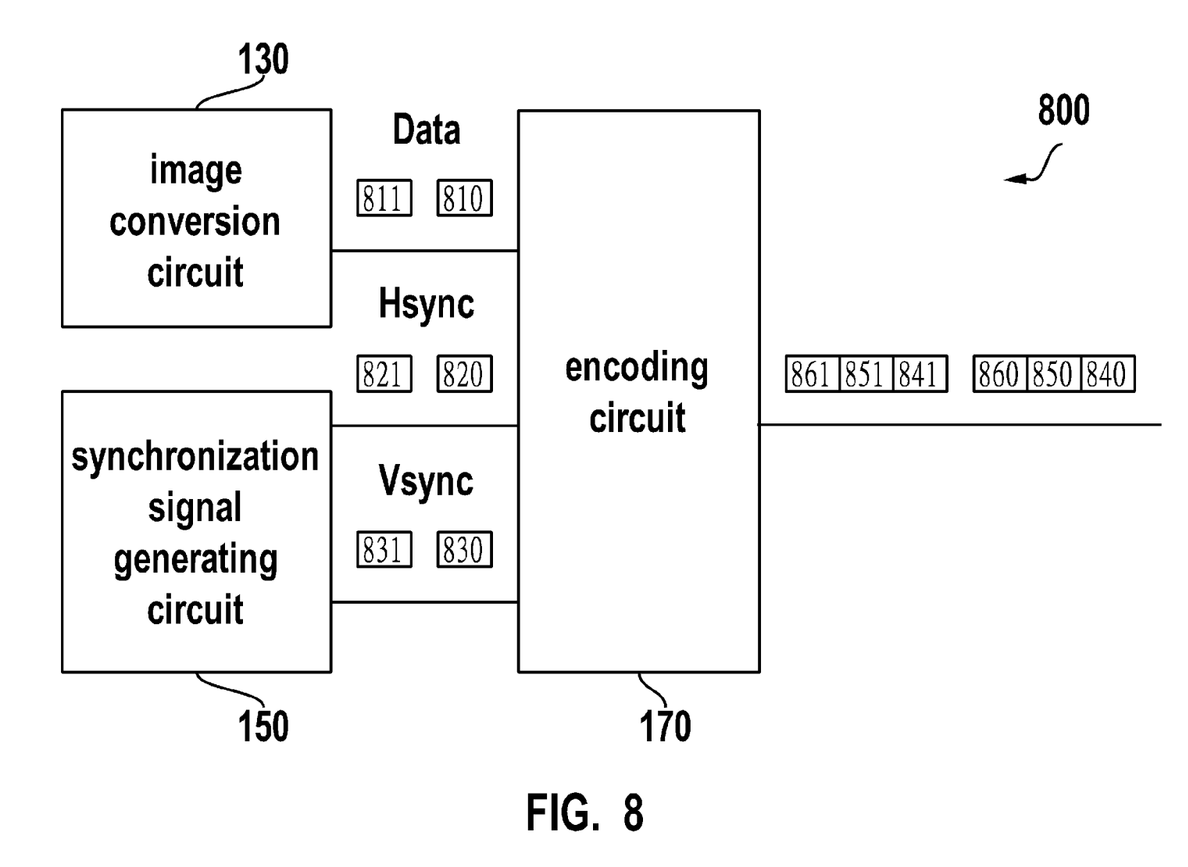
FIG. 8 shows another example encoding process of an example image conversion circuit, an example synchronization signal generating circuit, and an example encoding circuit, all arranged in accordance with at least some embodiments of the present disclosure described herein.

FIG. 8 shows a simplified block diagram 800 of the image conversion circuit 130, the synchronization signal generating circuit 150, and the encoding circuit 170 in FIG. 1. After receiving the image data 810, the horizontal synchronization signal 820, and the vertical synchronization signal 830 from the image conversion circuit 130 and the synchronization signal generating circuit 150, the encoding circuit 170 generates the encoded image data 840, the encoded horizontal synchronization signal 850, and the encoded vertical synchronization signal 860. In this embodiment, the horizontal synchronization signal 820, and the vertical synchronization signal 830 are not synchronized. For example, assuming the signals herein are active high signals, the horizontal synchronization signal 820 is still low and the vertical synchronization signal 830 already becomes high. The encoding circuit 170 therefore configures the corresponding encoded vertical synchronization signal 860 to be low. Afterward, the encoding circuit 170 receives the image data 811, the horizontal synchronization signal 821, and the vertical synchronization signal 831. The horizontal synchronization signal 821 and the vertical synchronization signal 831 both have become high. The encoding circuit 170 therefore configures the corresponding encoded vertical synchronization signal 861 to be high. In this embodiment, the encoding circuit 170 combines the signal encoding operation and the synchronization operation of the horizontal synchronization signals and the vertical synchronization signals so that the start time of the horizontal synchronization signals and the vertical synchronization signals may be substantially the same.

Although "seconds" is used above to describe the period of the signals, the period mentioned above may be less than 1 second, e.g. several milliseconds. In other embodiments, the signals mentioned above may be respectively active high signals or active low signals. The signals may also be digital signals or analog signals. People of ordinary skill in the art may understand the signals may also be referred as different name, e.g., the vertical synchronization signals may also be referred as the frame synchronization signals. The present invention may also be adopted in other image conversion applications, e.g., resolution conversion applications, horizontal blanking interval conversion applications, vertical blanking interval conversion applications, and/or other image display applications with two or more synchronization signals with different periods. For example, the present invention may be adopted in the application wherein an image frame corresponds to multiple horizontal synchronization signals and multiple vertical synchronization signals, and the application wherein an image frame corresponds to multiple horizontal synchronization signals, one or more field synchronization signals, and one or more vertical synchronization signals. The image conversion device and/or the components therein may be realized as a single device or integrated with other device(s). For example, the image conversion device may be a stand-alone device, integrated with the image providing device, or integrated with the display device. The vertical synchronization signal generating circuit and the horizontal synchronization signal generating circuit may also be integrated as a single circuit. The above-mentioned embodiments may also be properly combined without contradiction.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An image conversion device, comprising:
    an image converting circuit for receiving a first and a second image frames of a first format and generating a third and a fourth image frames of a second format; and
    a signal generating circuit, coupled with the image converting circuit, for generating a plurality of first synchronization signals having a substantially fixed period and one or more second synchronization signals for the third and the fourth image frames;
    wherein each of the second synchronization signals is synchronized with one of the first synchronization signals, and the third image frame contains at least one more first synchronization signal than the fourth image frame.

2. The image conversion device of claim 1, wherein the signal generating circuit generates the second synchronization signals according to the first synchronization signals.

3. The image conversion device of claim 2, wherein the signal generating circuit combines a third signal and the first synchronization signals to generate the second synchronization signals.

4. The image conversion device of claim 1, wherein the signal generating circuit generates the first synchronization signals and/or the second synchronization signals according to a clock signal.

5. The image conversion device of claim 4, wherein the signal generating circuit combines a third signal and the clock signal to generate the first synchronization signals, and/or combines a fourth signal and the clock signal to generate the second synchronization signals.

6. The image conversion device of claim 1, wherein the signal generating circuit further comprises an encoding circuit for encoding the first synchronization signals to generate the second synchronization signals.

7. The image conversion device of claim 6, wherein the first synchronization signals and the second synchronization signals are provided to a display device as horizontal synchronization signals and vertical synchronization signals, respectively.

8. The image conversion device of claim 1, wherein the first synchronization signals and the second synchronization signals are provided to a display device as horizontal synchronization signals and vertical synchronization signals, respectively.

9. The image conversion device of claim 1, wherein the signal generating circuit configures the start time of the first synchronization signals and the start time of the second synchronization signals to be substantially the same.

10. An image conversion method, comprising:
receiving a first and a second image frames of a first format;
generating a third image frame and a fourth image frame of a second format;
generating a plurality of first synchronization signals for the third image frame and the fourth image frame; and
generating one or more second synchronization signals for the third and the fourth image frames, each of the second synchronization signals synchronized with one of the first synchronization signals;
wherein the first synchronization signals have a substantially fixed period, and the third image frame contains at least one more first synchronization signal than the fourth image frame.

11. The image conversion method of claim 10, further comprising generating the second synchronization signals according to the first synchronization signals.

12. The image conversion method of claim 11, further comprising combining a third signal and the first synchronization signals to generate the second synchronization signals.

13. The image conversion method of claim 10, further comprising generating the first synchronization signals and/or the second synchronization signals according to a clock signal.

14. The image conversion method of claim 13, further comprising combining a third signal and the clock signal to generate the first synchronization signals, and/or combining a fourth signal and the clock signal to generate the second synchronization signals.

15. The image conversion method of claim 10, further comprising encoding the first synchronization signals and the second synchronization signals as an encoded data.

16. The image conversion method of claim 15, further comprising:
decoding the encoded data;
providing the decoded first synchronization signals as horizontal synchronization signals of a display device; and
providing the decoded second synchronization signals as vertical synchronization signals of the display device.

17. The image conversion method of claim 10, further comprising:
providing the first synchronization signals as horizontal synchronization signals of a display device; and
providing the second synchronization signals as vertical synchronization signals of the display device.

18. The image conversion method of claim 10, further comprising configuring the start time of the first synchronization signals and the start time of the second synchronization signals to be substantially the same.

19. An image conversion device, comprising:
an image converting circuit for receiving a first and a second image frames and generating a third and a fourth image frames; and
a signal generating circuit, coupled with the image converting circuit, for generating a plurality of first synchronization signals having a substantially fixed period and one or more second synchronization signals for the third image frame and the fourth image frame;
wherein the signal generating circuit synchronizes the first synchronization signals and the second synchronization signals by delaying the start time of the second synchronization signal to the start time of one of the first synchronization signals.

20. The image conversion device of claim 19, wherein the first synchronization signals and the second synchronization signals are provided to a display device as horizontal synchronization signals and vertical synchronization signals, respectively.

* * * * *